Patented Feb. 25, 1941

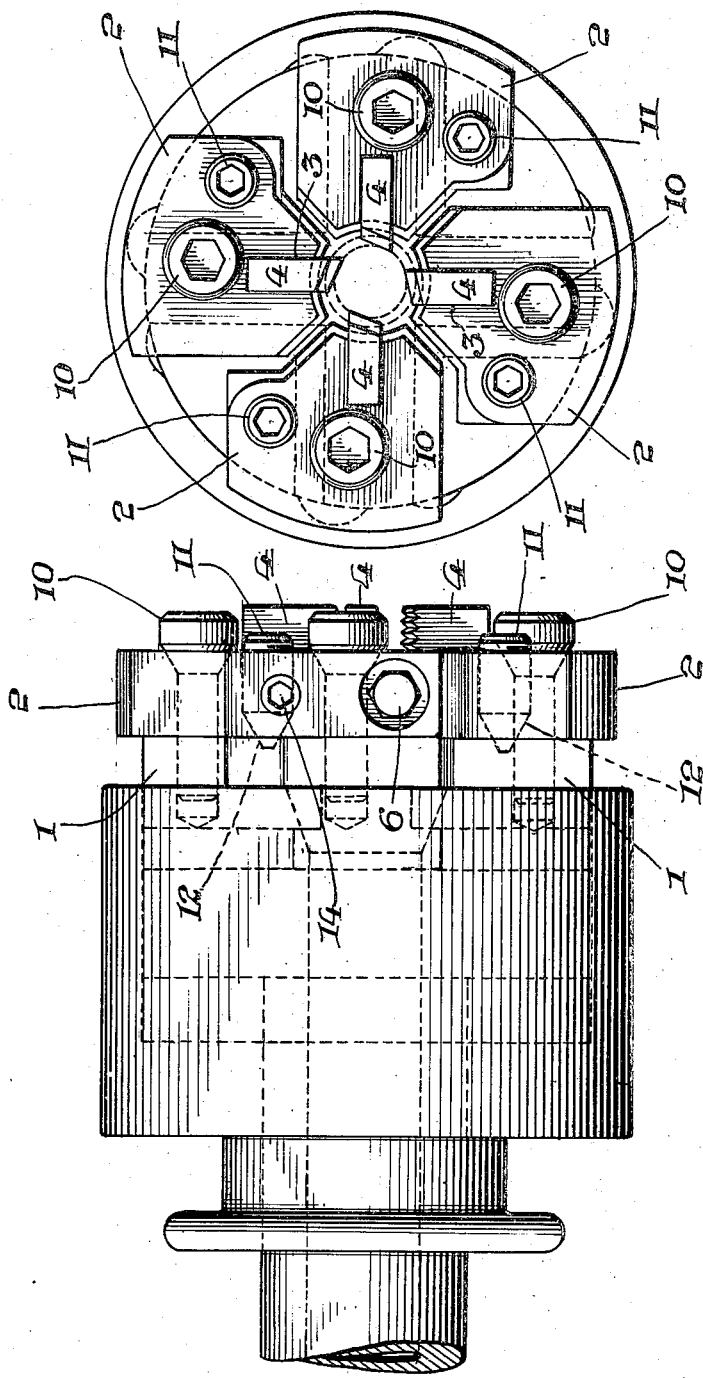

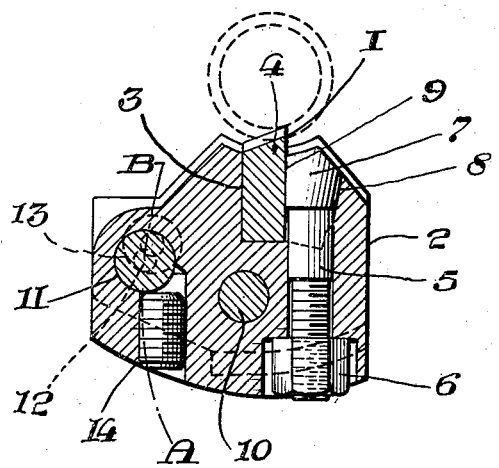
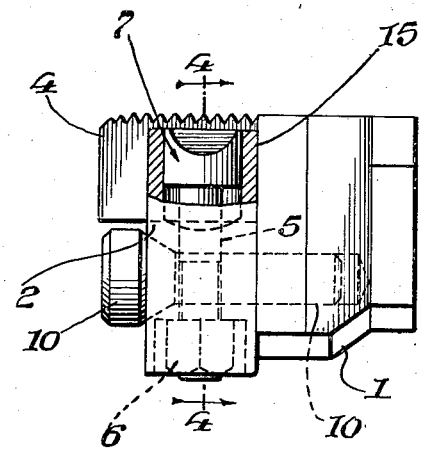
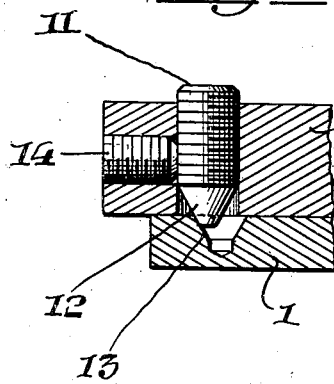
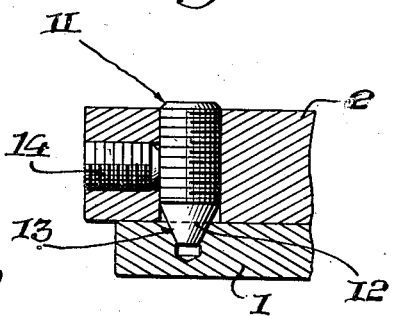
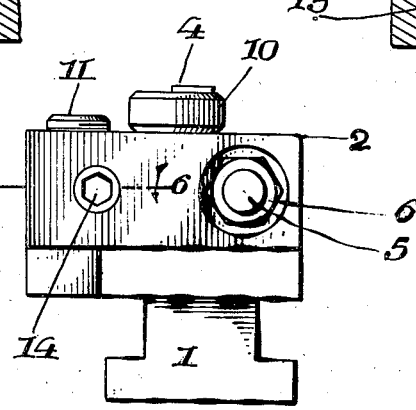

2,232,854

UNITED STATES PATENT OFFICE 2,232,854

CHASER BLOCK AND CARRIER

William J. Hogg, Cleveland, Ohio, assignor to The National Acme Company, Cleveland, Ohio, a corporation of Ohio Application September 20, 1939, Serial No. 295,721

20 Claims. (Cl. 10—104)

This invention relates to chaser holding means and particularly to an improved adjustable chaser carrier shiftable on its block to provide for an adjustment of the clearance or rake angle of the chaser, and which is simple in construction and inexpensive to manufacture while at the same time is efficient in use.

The economical production of machine parts from such metals as aluminum, brass, copper, magnesium, steel and their alloys requires specially prepared, adapted and designed cutting tools, and heretofore, together with the proper selection of tooling and the provision of free cutting conditions for the various metals, it has been necessary to grind tools with suitable clearance and rake angles for operation on each type of metal. Therefore, since most tools are made from expensive metal alloys, the necessity of providing many different tools and frequent grinding thereof to give proper clearances, has reduced tool life with resultant increased cost of manufacture and as a change of tooling during course of manufacture further adds to manufacturing costs due to increased set-up time, it follows that by adjusting clearance and rake angles in accordance with the materials to be worked, operating costs would be materially reduced.

Chasers, under present conditions, are inserted in the die and held in a predetermined position. However, if the clearances are not correct, a new set of chasers with more or less clearance is substituted or the chasers are changed by regrinding with resulant loss in the life of the chasers. With the present improvement, however, a slight adjustment of the carrier will, in most cases, correct this clearance without regrinding the chasers or substituting a new set. Also, if the chasers are ground on the face they can be adjusted up to proper position giving the correct clearance. In regular milled type chasers, if the face is ground, this changes the clearance and the chasers will not cut as uniformly due to being behind correct cutting position.

In the drawings accompanying and forming a part of this specification, Fig. 1 is a side elevation of a die head.

Fig. 2 is a front end view thereof illustrating four chasers, each carried by this improved adjustable carrier and its block.

Fig. 3 is a side elevation of the chaser block, chaser carrier and its chaser removed from the die head and partly in section.

Fig. 4 is a sectional view taken on line 4—4, Fig. 3.

Fig. 5 is a view similar to Fig. 3 taken at right angles thereto.

Fig. 6 is a sectional view taken on line 6—6, Fig. 5, and

Fig. 7 is a similar view with the adjustable carrier in one extreme position relative to its block.

Similar characters of reference indicate corresponding parts in the several views.

Before explaining in detail the present improvement and mode of operation thereof, I desire it understood that the invention is not limited to the details of construction and arrangement of parts illustrated in the accompanying drawings since the invention is capable of other embodiments and that the phraseology employed is for the purpose of description and not of limitation.

The present improvement comprises a chaser block 1 having the usual T-projection for insertion into a T-slot of the die head, a common and well-known construction, and a detailed description thereof is unnecessary.

The face of this chaser block 1 is machined to receive a chaser carrier 2 provided with a machined slot 3 for the reception of a chaser 4 retained in the carrier 2 by a locking screw 5 and nut 6. This locking screw 5 is provided with a tapered head 7 adapted to engage a tapered hole 8 in the carrier 2 so that when the nut 6 is tightened, the face 9 of the head 7 is forced against the chaser 4 to hold it securely in its carrier 2.

Extending through the chaser carrier 2 into threaded engagement with the chaser block 1 is a screw 10 adapted to act, when loosened, as a pivotal point about which the chaser carrier 2 may be rotated in order to effect radial adjustment of the chasers limited by the adjustable screw 11 provided with a tapered point 12 adapted to seat in a tapered hole 13 of the block 1 and which, when seated as in Fig. 7, provides a minimum clearance of the chasers.

To increase the clearance angle, the screw 10 is loosened and the chaser carrier 2 rotated in counterclockwise direction in the arc AB (see Fig. 4). When the desired clearance has been obtained, a set screw 14 is firmly set against the screw 11 to maintain adjustment and the screw 10 then tightened forcing the face 15 of the carrier 2 against the chaser block 1 to lock the carrier in its adjusted position relative to the chaser block.

Thus it will be noted that the screw 11 is so positioned with its tapered end in the tapered hole 13 as to resist cutting strain and prevent rotation of the chaser carrier relative to the chaser block, thereby relieving the strain on the screw 10.

The present improvement permits the operator to remove the chasers for sharpening without affecting the clearance or the setting and other chasers with the same clearance angle may be used to replace worn out chasers without changing the adjustment and the same improvement may be used with various kinds of chasers.

When the chasers are ground on the face, the clearance angle changes but can be set ahead to correct the position by adjustment of the carrier.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A chaser holding means comprising a chaser block having a face, a chaser carrier pivotally mounted on said face whereby on the shifting of said carrier relative to its block a change in the clearance angle of the chaser will be effected, and means for limiting the adjustment of said carrier, said limiting means having engagement with the chaser block and carrier for resisting cutting strain.

2. A chaser holding means comprising a chaser block, a chaser carrier adjustably secured thereto whereby on the shifting of said carrier relative to its block a change in the clearance angle of the chaser will be effected, means for locking the chaser carrier and block against relative shifting, and means independent of said locking means for limiting the adjustment of said carrier, said limiting means comprising tapered means, having engagement with the chaser block and carrier for resisting cutting strain.

3. A chaser holding means comprising a chaser block, a chaser carrier adjustably secured thereto whereby on the shifting of said carrier relative to its block a change in the clearance angle of the chaser will be effected, means for locking the chaser carrier and block against relative shifting, means independent of said locking means for limiting the adjustment of said carrier, said limiting means comprising tapered means having engagement with the chaser block and carrier for resisting cutting strain, and means for locking said limiting means.

4. A chaser holding means comprising a chaser block, a chaser carrier pivotally secured thereto for rotative adjustment whereby on the shifting of said carrier relative to its block a change in the clearance angle of the chaser will be effected, means for locking the chaser carrier and block against rotative adjustment, and means independent of said locking means for limiting the adjustment of the carrier on its pivot, said limiting means having engagement with the chaser block and carrier for resisting cutting strain.

5. A chaser holding means comprising a chaser block having a face, a chaser carrier pivotally mounted on said face for rotative adjustment whereby on the shifting of said carrier relative to its block a change in the clearance angle of the chaser will be effected, and means for limiting the adjustment of the carrier on its pivot, said limiting means comprising tapered means, having engagement with the chaser block and carrier for resisting cutting strain.

6. A chaser holding means comprising a chaser block having a face, a chaser carrier pivotally mounted on said face for rotative adjustment whereby on the shifting of said carrier relative to its block a change in the clearance angle of the chaser will be effected, means for limiting the adjustment of the carrier on its pivot, said limiting means comprising tapered means having engagement with the chaser block and carrier for resisting cutting strain, and means for locking said tapered means.

7. A chaser holding means comprising a chaser block, a chaser carrier adjustably secured thereto whereby on the shifting of said carrier relative to its block a change in the clearance angle of the chaser will be effected, means for locking the chaser carrier and block against relative shifting, and means independent of said locking means for limiting the adjustment of said carrier and comprising a tapered and threaded member and a tapered opening, one carried by the carrier and the other by the block.

8. A chaser holding means comprising a chaser block, a chaser carrier adjustably secured thereto whereby on the shifting of said carrier relative to its block a change in the clearance angle of the chaser will be effected, means for locking the chaser carrier and block against relative shifting, and means independent of said locking means for limiting the adjustment of said carrier and comprising a threaded tapered member carried by the carrier and a tapered opening carried by the block.

9. A chaser holding means comprising a chaser block, a chaser carrier adjustably secured thereto whereby on the shifting of said carrier relative to its block a change in the clearance angle of the chaser will be effected, means for locking the chaser carrier and block against relative shifting, means independent of said locking means for limiting the adjustment of said carrier and comprising a tapered and threaded member and a tapered opening, one carried by the carrier and the other by the block, and means for locking said tapered member.

10. A chaser holding means comprising a chaser block, a chaser carrier adjustably secured thereto whereby on the shifting of said carrier relative to its block a change in the clearance angle of the chaser will be effected, means for locking the chaser carrier and block against relative shifting, means independent of said locking means for limiting the adjustment of said carrier and comprising a threaded tapered member carried by the carrier and a tapered opening carried by the block, and means for locking said tapered member.

11. A chaser holding means comprising a chaser block having a face, a chaser carrier pivotally mounted on said face for rotative adjustment whereby on the shifting of said carrier relative to its block a change in the clearance angle of the chaser will be effected, and means for limiting the adjustment of the carrier on its pivot and comprising a threaded tapered member and a tapered opening carried by said carrier and block.

12. A chaser holding means comprising a chaser block having a face, a chaser carrier pivotally mounted on said face for rotative adjustment whereby on the shifting of said carrier relative to its block a change in the clearance angle of the chaser will be effected, and means for limiting the adjustment of the carrier on its pivot and comprising a threaded tapered member carried by the carrier and a tapered opening carried by the block.

13. A chaser holding means comprising a chaser block having a face, a chaser carrier pivotally mounted, on said face for rotative adjustment whereby on the shifting of said carrier relative to its block a change in the clearance angle of the chaser will be effected, means for limiting the adjustment of the carrier on its pivot and comprising a threaded tapered member and a tapered opening carried by said carrier and block, and means for locking said tapered member.

14. A chaser holding means comprising a chaser block having a face, a chaser carrier pivotally mounted on said face for rotative adjustment whereby on the shifting of said carrier relative to its block a change in the clearance angle of the chaser will be effected, means for limiting the adjustment of the carrier on its pivot and comprising a threaded tapered member carried by the carrier and a tapered opening carried by the block, and means for locking said tapered member.

15. A chaser holding means comprising a chaser block, a chaser carrier adjustably secured thereto whereby on the shifting of said carrier relative to its block a change in the clearance angle of the chaser will be effected, means for limiting the adjustment of said carrier, said limiting means having engagement with the chaser block and carrier for resisting cutting strain, and means having a chaser engaging face and an oppositely disposed tapered face cooperating with a tapered portion of the chaser carrier for securing the chaser in its carrier.

16. A chaser holding means comprising a chaser block, a chaser carrier pivotally secured thereto for rotative adjustment whereby on the shifting of said carrier relative to its block a change in the clearance angle of the chaser will be effected, means for limiting the adjustment of the carrier on its pivot, said limiting means having engagement with the chaser block and carrier for resisting cutting strain, and means having a chaser engaging face and an oppositely disposed tapered face cooperating with a tapered portion of the chaser carrier for securing the chaser in its carrier.

17. A chaser holding means comprising a chaser block, a chaser carrier pivotally secured thereto for rotative adjustment relative to the block whereby on shifting said carrier relative to its block a change in the clearance angle of the chaser will be effected, means for limiting the adjustment of said carrier and comprising a threaded tapered member carried by the carrier and a tapered opening carried by the block, means for locking said tapered member, and means having a tapered portion cooperating with a tapered portion of the chaser carrier and engaging the chaser for clamping the chaser in the carrier.

18. A chaser holding means comprising a chaser block, a chaser carrier pivotally secured thereto for rotative adjustment relative to the block whereby on shifting said carrier relative to its block a change in the clearance angle of the chaser will be effected, means for limiting the adjustment of said carrier and comprising a threaded tapered member carried by the carrier and a tapered opening carried by the block, means for locking said tapered member, and means having a tapered portion cooperating with a tapered portion of the chaser carrier and engaging the chaser and comprising a threaded member and a nut for adjusting said member for clamping the chaser in the carrier.

19. A chaser holding means comprising a chaser block having means for guiding it in a die head, a chaser carrier pivotally secured thereto for rotative adjustment relative to the block whereby on shifting said carrier relative to its block a change in the clearance angle of the chaser will be effected, means for limiting the adjustment of said carrier and comprising a threaded tapered member carried by the carrier and a tapered opening carried by the block, means for locking said tapered member and comprising a threaded rotatable member, and means having a tapered portion cooperating with a tapered portion of the chaser carrier and for engaging the chaser and comprising a threaded member and a nut for adjusting said member for clamping the chaser in the carrier.

20. A chaser holding means comprising a chaser block, a chaser carrier adjustably secured thereto whereby on shifting the carrier relative to its block a change in the clearance angle of the chaser will be effected, and means pivotally securing the chaser carrier to its block and adjustable to force the face of the carrier against the chaser block thereby to lock the carrier against adjustment, and means independent of said pivotal means for limiting the adjustment of the carrier on its block, said limiting means having engagement with the chaser block and carrier for resisting cutting strain.

WILLIAM J. HOGG.